United States Patent
Seo et al.

(10) Patent No.: US 7,764,551 B2
(45) Date of Patent: Jul. 27, 2010

(54) SEMICONDUCTOR MEMORY SYSTEM HAVING VOLATILE MEMORY AND NON-VOLATILE MEMORY THAT SHARE BUS, AND METHOD OF CONTROLLING OPERATION OF NON-VOLATILE MEMORY

(75) Inventors: Hui-kwon Seo, Suwon-si (KR); Han-gu Sohn, Suwon-si (KR); Sei-jin Kim, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 289 days.

(21) Appl. No.: 12/078,422

(22) Filed: Mar. 31, 2008

(65) Prior Publication Data
US 2008/0291727 A1    Nov. 27, 2008

(30) Foreign Application Priority Data
May 23, 2007   (KR) ...................... 10-2007-0050258

(51) Int. Cl.
*G11C 7/10* (2006.01)
(52) U.S. Cl. ........................... 365/189.05; 365/189.17; 365/189.2; 365/185.08; 365/194
(58) Field of Classification Search ............ 365/189.05, 365/189.17, 189.2, 185.08, 194
See application file for complete search history.

(56) References Cited

U.S. PATENT DOCUMENTS 5,845,066 A * 12/1998 Fukuzumi ................... 726/19
6,266,282 B1    7/2001 Hwang et al.
6,339,552 B1 *  1/2002 Taruishi et al. ......... 365/189.05

(Continued)

FOREIGN PATENT DOCUMENTS

| JP | 2002-366429 | 12/2002 |
|---|---|---|
| KR | 10-0285063 | 3/2001 |
| KR | 10-0508041 | 8/2005 |

OTHER PUBLICATIONS

English Language Abstract of KR 1020000013842 dated Mar. 6, 2000.
English Language Abstract of KR 1020030014379 dated Feb. 17, 2003.

*Primary Examiner*—Viet Q Nguyen
(74) *Attorney, Agent, or Firm*—Harness Dickey & Pierce, P.L.C.

(57) ABSTRACT

Example embodiments relate to a semiconductor memory system which may include a volatile memory and a non-volatile memory that share a common bus, and a method for controlling the operation of the non-volatile memory. The semiconductor memory system may include a non-volatile memory and a memory controller. The non-volatile memory may include a buffer memory that temporarily stores data to be read from or to be written to a memory cell array, and an internal controller. The memory controller may transmits a mode signal to the non-volatile memory in response to a control signal, the control signal corresponds to either a read mode or a write mode to be applied to the non-volatile memory. In response to the mode signal, the internal controller may control the data to be read to be stored in the buffer memory, if the read mode is to be applied, and the internal controller may control the buffer memory to stand-by until a write command is received, if the write mode is to be applied.

33 Claims, 8 Drawing Sheets

U.S. PATENT DOCUMENTS

| | | | |
|---|---|---|---|
| 6,404,684 B2 * | 6/2002 | Arimoto et al. | 365/189.18 |
| 6,424,590 B1 * | 7/2002 | Taruishi et al. | 365/230.08 |
| 6,426,915 B2 * | 7/2002 | Ohshima et al. | 365/233.1 |
| 6,427,197 B1 * | 7/2002 | Sato et al. | 711/169 |
| 6,515,928 B2 * | 2/2003 | Sato et al. | 365/222 |
| 6,545,941 B2 * | 4/2003 | Kato et al. | 365/233.12 |
| 6,629,224 B1 * | 9/2003 | Suzuki et al. | 711/167 |
| 6,754,126 B2 * | 6/2004 | Yamaguchi et al. | 365/222 |
| 7,522,467 B2 * | 4/2009 | An | 365/230.03 |
| 7,606,111 B2 * | 10/2009 | Lee et al. | 365/238.5 |

\* cited by examiner

| Command | CS# | RAS# | CAS# | WE# | BA | ADDR |
|---|---|---|---|---|---|---|
| ACTIVE | L | L | H | H | Valid | ROW |
| READ | L | H | L | H | Valid | Col |
| WRITE | L | H | L | L | Valid | Col |
| PRECHARGE | L | L | H | L | Valid | X |
| PRE ACTIVE | | | | | Valid | ROW |

SEMICONDUCTOR MEMORY SYSTEM HAVING VOLATILE MEMORY AND NON-VOLATILE MEMORY THAT SHARE BUS, AND METHOD OF CONTROLLING OPERATION OF NON-VOLATILE MEMORY

PRIORITY STATEMENT

This U.S. non-provisional patent application claims priority under 35 U.S.C. §119 of Korean Patent Application No. 10-2007-0050258, filed on May 23, 2007, in the Korean Intellectual Property Office, the disclosure of which is incorporated herein in its entirety by reference.

BACKGROUND

1. Field

Example embodiments relate to a semiconductor memory system, for example, a semiconductor memory system including a volatile memory and a non-volatile memory, which share a common bus, and a method for controlling the operation of the non-volatile memory.

2. Description of the Related Art

Conventional memory systems may independently utilize a volatile memory and a non-volatile memory, where the control of the volatile and non-volatile memory may be performed separately. For example, the volatile memory may require a memory controller, and the non-volatile memory may require another memory controller. However, in order to guarantee high-speed characteristics and reduce the total number of input/output pins required, memory systems having a volatile memory and a non-volatile memory, which share a common bus, have recently been developed.

A conventional non-volatile memory (e.g., NOR flash memory) may require more row addresses than a volatile memory (e.g., dynamic random access memory (DRAM)) in order to select a word line. Therefore, in order to select a word line, the volatile memory may perform an active command only once, but the non-volatile memory may perform the active command twice.

Furthermore, as compared to a conventional volatile memory, the conventional non-volatile memory may utilize a buffer memory when performing a read/write operation on a memory cell array. For example, in order to write data to the non-volatile memory, the data may not be written directly to the non-volatile memory, but rather may be first stored in the buffer memory. Thereafter, if an appropriate amount of data is stored in the buffer memory or a write command is applied to the buffer memory, the stored data may be written to the non-volatile memory cells. Likewise, in order to read data from the flash memory, the data may be first read from the non-volatile memory cells, and then may be temporarily stored in the buffer memory. Thereafter, if an appropriate amount of data is stored in the buffer memory or a read command is applied to the buffer memory, the stored data may be outputted from the non-volatile memory. An operation for reading the data from the non-volatile memory cells and temporarily storing the data in the buffer memory during the read operation may be referred to as a sensing operation.

Generally, a duration of time required to perform the sensing operation after an active command is applied may be referred to as a sensing time. In conventional systems, both the read and write operations have a sensing time. For example, a conventional non-volatile memory may not be able to determine whether to perform the read operation or the write operation when an active command is applied to the non-memory. Because the conventional non-volatile memory cannot make this determination, the non-volatile memory may perform the sensing operation with respect to the read and write operations. Performing the read operation after the sensing time does not pose many problems, but performing the write operation after the sensing time may lead to an unnecessary consumption of current and sensing time.

SUMMARY

Example embodiments provide a semiconductor memory system including a volatile memory and a non-volatile memory that share a common bus, which is capable of controlling the non-volatile memory in various ways depending on whether the non-volatile memory is to perform a read operation or a write operation, thereby reducing the consumption of current and the time required to perform a read/write operation.

Example embodiments demonstrate that the write operation may be performed by storing data to be written in the buffer memory without performing the sensing operation.

According to example embodiments, a semiconductor memory system includes a volatile memory and a non-volatile memory that share a common bus. The semiconductor memory system may comprise a non-volatile memory including a buffer memory that temporarily stores data to be read from or to be written to a memory cell array, an internal controller, and a memory controller transmitting a mode signal to the non-volatile memory in response to a control signal, the control signal may correspond to either a read mode or a write mode to be applied to the non-volatile memory. If the read mode is applied in response to the mode signal, the internal controller may control the data to be read to be stored in the buffer memory, and if the write mode is applied in response to the mode signal, the internal controller may control the buffer memory to stand-by until a write command is received.

According to example embodiments, the memory controller may transmit the mode signal via a reserved address pin of the non-volatile memory in response to the control signal. The mode signal may have different logic states depending on whether the read mode or the write mode is to be applied, the mode signal being stored in an address bit corresponding to the reserved address pin, and the internal controller may control the buffer memory according to the logic state of the mode signal stored in the address bit. The mode signal may correspond to the read mode or the write mode which is to be applied to the non-volatile memory.

If the read mode is to be applied in response to the control signal, the memory controller may transmit a read command to the non-volatile memory after a first period, and if the write mode is to be applied in response to the control signal, the memory controller may transmit the write command to the non-volatile memory after a second period, the first period may be a period when the data to be read is stored in the first buffer memory, and the second period may be a standby period when the data to be written waits to be written to the second buffer memory. The second period may be shorter than the first period.

According to example embodiments, the memory controller may transmit an MRS (mode register set) command to the non-volatile memory in response to a control signal, the control signal corresponds to a read mode or a write mode to be applied to the non-volatile memory. If the read mode is applied in response to the MRS command, the internal controller may control the data to be read to be stored in the buffer memory, and if the write mode is applied in response to the MRS command, the internal controller may control the buffer memory to stand-by until a write command is received.

According to example embodiments, the MRS command may correspond to the read mode or the write mode to be applied to the non-volatile memory. Also, the memory controller may transmit the MRS command to the non-volatile memory if the read mode or the write mode ends.

According to example embodiments, a method for controlling the operation of a non-volatile memory of a semiconductor memory system includes a volatile memory and the non-volatile memory that share a common bus, wherein the non-volatile memory may include a memory cell array and a buffer memory, the buffer memory may temporarily store data to be read from or written to the memory cell array. The method may include transmitting a mode signal to the non-volatile memory in response to a control signal, the control signal corresponds to either a read mode or a write mode to be applied to the non-volatile memory, determining whether the read mode or the write mode is to be applied to the non-volatile memory in response to the mode signal. If the read mode is to be applied, controlling the data to be read to be stored in the buffer memory. If the write mode is to be applied, controlling the buffer memory to stand-by until a write command is received.

According to example embodiments, the transmitting of the mode signal may comprise transmitting the mode signal via a reserved address pin of the non-volatile memory in response to the control signal.

The method may further comprise storing the transmitted mode signal in an address bit corresponding to the reserved address pin, wherein the mode signal includes different logic states depending on whether the read mode or the write mode is to be applied.

According to example embodiments, a method for controlling the operation of a non-volatile memory of a semiconductor memory system may include determining whether to transmit a MRS (mode register set) command to the non-volatile memory in response to a control signal, the control signal corresponds to a either read mode or a write mode to be applied to the non-volatile memory. If the read mode to be applied is based on whether the MRS command is transmitted, controlling the data to be read to be stored in the buffer memory. If the write mode to be applied is based on whether the MRS command is transmitted, controlling the buffer memory to stand-by until a write command is transmitted.

BRIEF DESCRIPTION OF THE DRAWINGS

The above and other features and advantages of the present application will become more apparent by describing in detail example embodiments thereof with reference to the attached drawings in which.

DETAILED DESCRIPTION OF EXAMPLE EMBODIMENTS

Detailed example embodiments are disclosed herein. However, specific structural and functional details disclosed herein are merely representative for purposes of describing example embodiments. Accordingly, example embodiments are capable of various modifications and alternative forms. It should be understood, however, that there is no intent to limit example embodiments to the particular forms disclosed, but on the contrary, example embodiments are to cover all modifications, equivalents, and alternatives falling within the scope of the application.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used here, the term "and/or" includes any and all combinations of one or more of the associated listed items.

The terminology used herein is for the purpose of describing particular embodiments only and is not intended to be limiting. As used here, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Example embodiments will now be described more fully with reference to the accompanying drawings. This invention, however, may be embodied in many different forms and should not be construed as limited to example embodiments set forth herein. Rather, example embodiments are provided so that this disclosure will be thorough and complete, and will fully convey the scope of the application to those skilled in the art. In the drawings, like numbers refer to like elements throughout.

Figure 1:
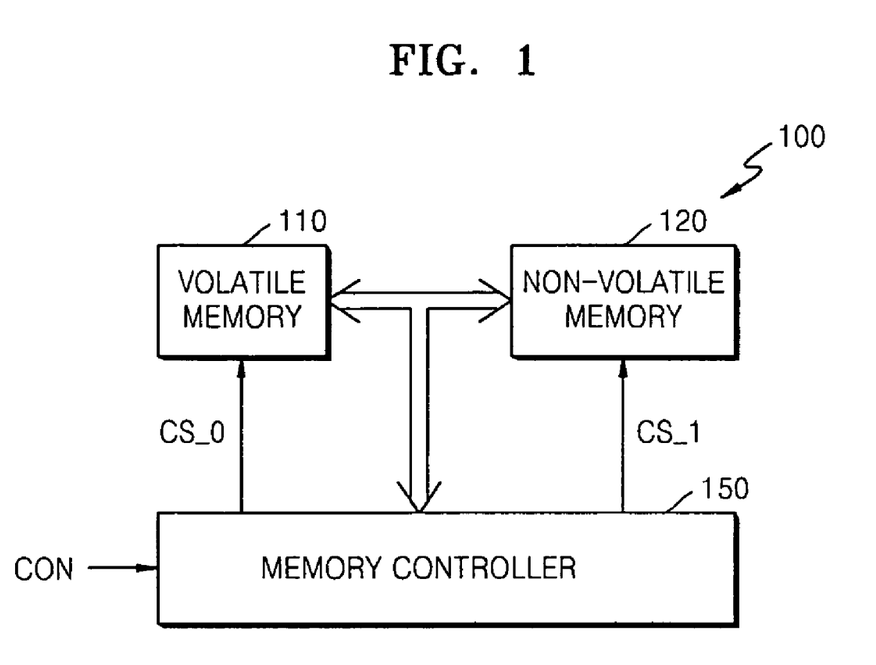
FIG. 1 is a block diagram of a semiconductor memory system according to example embodiments.

FIG. 1 is a block diagram of a semiconductor memory system 100 according to example embodiments. Referring to FIG. 1, the semiconductor memory system 100 may include a volatile memory 110, a non-volatile memory 120, and/or a memory controller 150. The volatile memory 110 and the non-volatile memory 120 may share a common bus. That is, the volatile memory 110 and the non-volatile memory 120 may share an address signal and a data line. Furthermore, the volatile memory 110 and the non-volatile memory 120 may be connected to the memory controller 150 through the common bus.

A volatile memory may be categorized as a dynamic random access memory (DRAM) and a static random access memory (SRAM), for example. A non-volatile memory may be categorized as a mask read-only memory (MROM), a programmable read-only memory (PROM), an erasable programmable read-only memory (EPROM), an electrically erasable programmable read-only memory (EEPROM), a phase change random access memory (PRAM), a resistive random access memory (RRAM), and a magnetic random access memory (MRAM), for example. In particular, a flash EEPROM (hereinafter referred to as "flash memory") may be categorized as a NAND type flash memory and a NOR type flash memory, for example.

Referring to FIG. 1, the memory controller 150 may control one or both of the volatile memory 110 and the non-volatile memory 120. The memory controller 150 may transmit chip selection signals CS_0 and CS_1 to the volatile memory 110 or the non-volatile memory 120 in order to select a memory that is to be controlled. In response to a control signal CON, the memory controller 150 may transmit a command to the volatile memory 110 for controlling the operation of the volatile memory 110 or may transmit a command to the non-volatile memory 120 for controlling the operation of the non-volatile memory 120. In other words, the memory controller 150 may transmit information and an operation command indicating whether a read mode or a write mode is to be applied to the volatile memory 110 or the non-volatile memory 120, in response to the control signal CON. Hereinafter, the read mode refers to a mode where the volatile memory 110 or the non-volatile memory 120 may perform the read operation, and the write mode refers a mode where the volatile memory 110 or the non-volatile memory 120 may perform the write operation.

Figure 2:
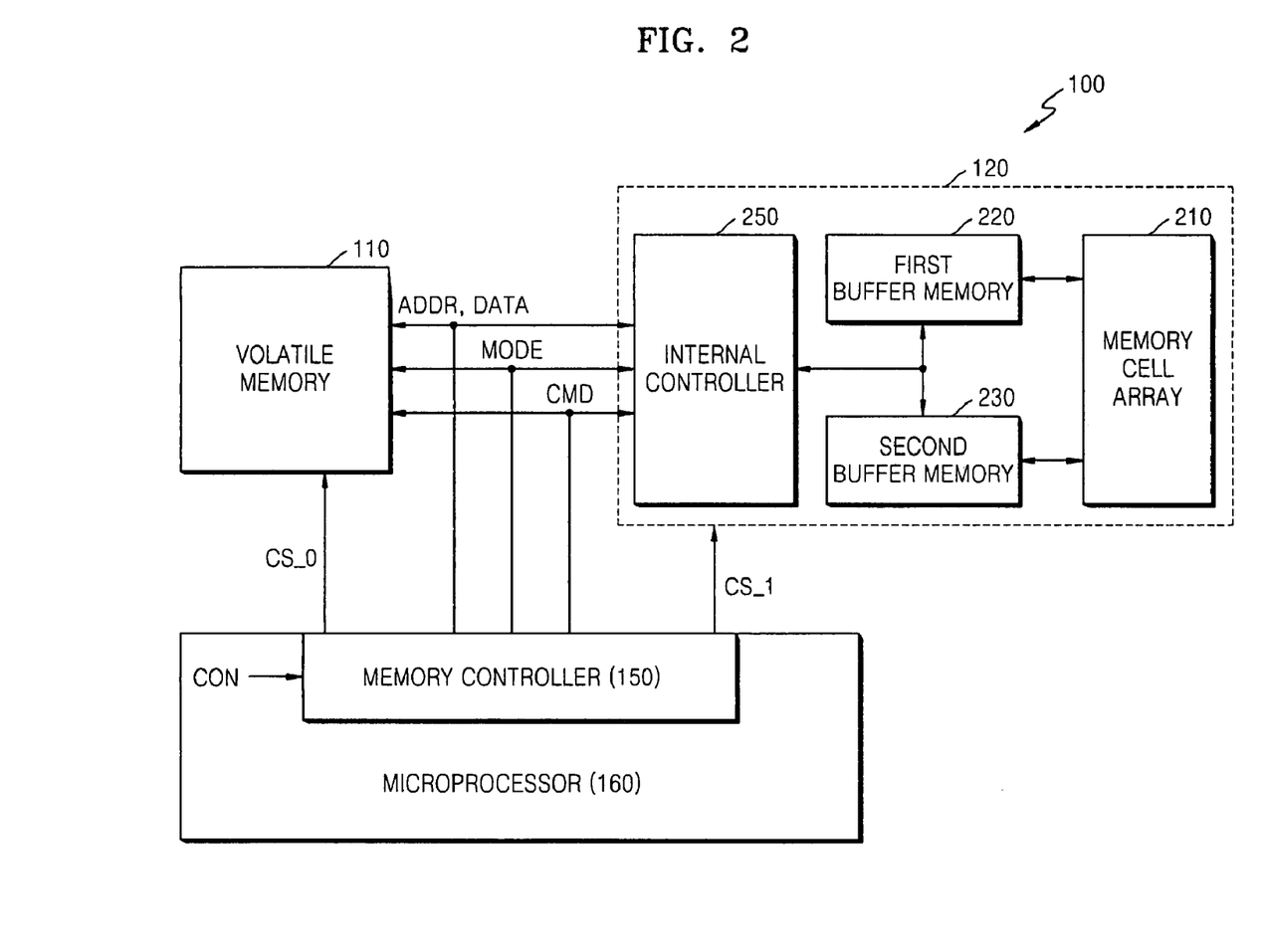
FIG. 2 is a block diagram illustrating the flow of signals in the semiconductor memory system of FIG. 1, according to example embodiments.

FIG. 2 is a block diagram illustrating the flow of signals in the semiconductor memory system of FIG. 1, according to example embodiments. Referring to FIG. 2, the non-volatile memory 120 may include a memory cell array 210, a first buffer memory 220, a second buffer memory 230, and/or an internal controller 250. The first and second buffer memories 220 and 230 may temporarily store data that is to be read or written to the memory cell array 210. The first buffer memory 220 may store the data that is to be read, and the second buffer memory 230 may store the data that is to be written. The first buffer memory 220 and the second buffer memory 230 may be embodied as one buffer memory.

The internal controller 250 may control the read/write operation to be performed on the first buffer memory 220, the second buffer memory 230, and the memory cell array 210, in response to a mode signal MODE, an address signal ADDR and an operation command CMD, supplied from the memory controller 150.

The memory controller 150 may apply a read/write command to the volatile memory 110 or the non-volatile memory 120 via the common bus, in response to the control signal CON received from a microprocessor 160. Also, the memory controller 150 may activate one of chip selection signals CS_0 and CS_1 in order to select one of the two memories 110 and 120.

The control signal CON may correspond to one of the read mode and the write mode, which is to be applied to the volatile memory 110 or the non-volatile memory 120. The control signal CON may be in a first logic state if the read mode is applied, and a second logic state if the write mode is applied, for example. Hereinafter, the first logic state refers to a logic low state and the second logic state refers to a logic high state, for example. The assigned logic states are for explanation purposes only, where other assigned logic states such the reverse situation may be within the example embodiments.

The mode signal MODE may correspond to one of the read mode and the write mode, which is to be applied to the volatile memory 110 or the non-volatile memory 120. The mode signal MODE may be in the first logic state if the read mode is applied, and the second logic state if the write mode is applied, for example. The assigned logic states are for explanation purposes only, where other assigned logic states such the reverse situation may be within the example embodiments, as in the case of the control signal CON.

In general, the operation command CMD may be a command transmitted from the memory controller 150 to the memory 110 or 120. For example, the command CMD transmitted to the non-volatile memory 120 may be a pre-active command, an active command, a read command, or a write command.

Figure 7A:
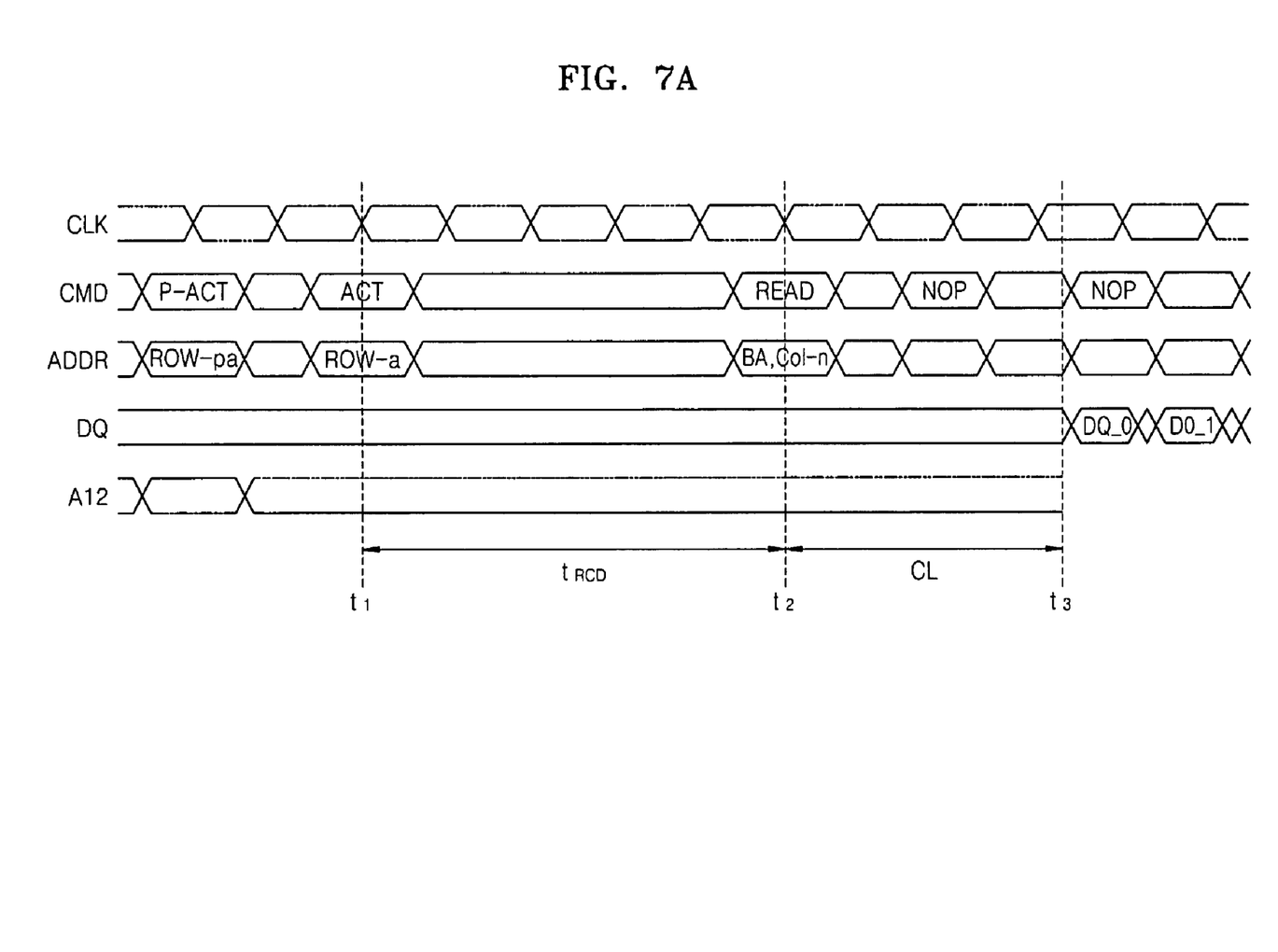
FIG. 7A is an example timing diagram of signals when the non-volatile memory 120 of FIGS. 1 and 2 performs a read operation.
Figure 7B:
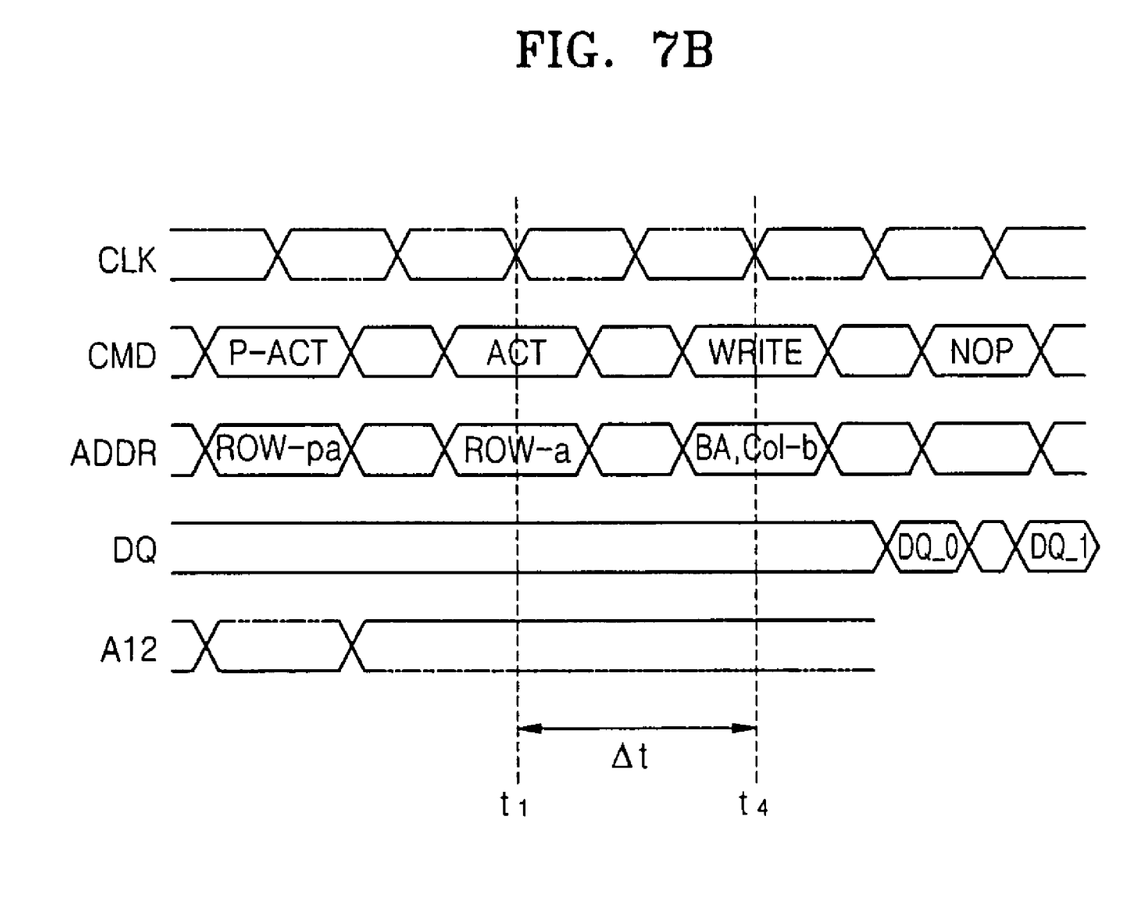
FIG. 7B is an example timing diagram of signals when the non-volatile memory 120 of FIGS. 1 and 2 performs a write operation.

If the read mode is to be applied in response to the control signal CON, the memory controller 150 may transmit the read command to the non-volatile memory 120 after a first period, where the first period includes storing the data to be read in the first buffer memory 220. Also, if the write mode is to be applied in response to the control signal CON, the memory controller 150 may transmit the write command to the non-volatile memory 120 after a second period, where the second period is when the write operation waits to be performed on the second buffer memory 230. The second period may be shorter than the first period. The above operation of the memory controller 150 will later be described in greater detail with reference to FIG. 7.

According to example embodiments, it may be possible to determine whether the read operation or the write operation is to be applied to the non-volatile memory 120, according to the mode signal MODE. The internal controller 250 may control the first buffer memory 220, the second buffer memory 230, and the memory cell array 210, depending on whether the read mode or the write mode is to be applied in response to the mode signal MODE.

If it is determined that the read mode is to be applied to the non-volatile memory 120 in response to the mode signal MODE, the internal controller 250 may store the data to be read in the first buffer memory 220. In other words, the internal controller 250 may control data to be read from the corresponding address of the memory cell array 210, and the sensing operation to be performed. The sensing operation may refer to an operation for reading the data from the corresponding address of the memory cell array 210, and temporarily storing the read data in the first buffer memory 220 in order to perform the read operation. If a certain amount of data is stored in the first buffer memory 220, or a read operation is applied to the first buffer memory 220, the memory controller 150 may transmit the read command, which may be the operation command CMD, to the non-volatile memory 120 in order to output the data stored in the first buffer memory 220 to the outside of the non-volatile memory 120.

If it is determined that the write mode is to be applied to the non-volatile memory 120 in response to the mode signal MODE, the internal controller 250 may control the second buffer memory 230 to stand-by until the write command is received. If the write command is received, the internal controller 250 may control the data to be written to be temporarily stored in the second buffer memory 230. If a certain amount of data is stored in the second buffer memory 230, or a write operation is applied to the second buffer memory 230, the data stored in the second buffer memory 230 may be read and then may be stored at the corresponding address of the memory cell array 210. In contrast to the read operation, the sensing operation of the write operation is not performed because data is not read from the memory cell array 210 and stored in the first or second buffer memory 220 or 230.

According to example embodiments, if it is determined that the read operation is to be applied to the non-volatile memory 120, the sensing operation may be performed, and if it is determined that the write mode is to be applied to the non-volatile memory 120, the sensing operation is not performed. Accordingly, if the non-volatile memory 120 performs the write operation, the sensing operation is bypassed, thus reducing the consumption of current and time.

According to a method of example embodiments, the memory controller 150 may transmit the mode signal MODE for determining whether the read mode or the write mode is to be applied to the volatile memory 110 or the non-volatile memory 120. The memory controller 150 may transmit the mode signal MODE via a reserved address pin of the non-volatile memory 120. The mode signal MODE may be stored in an address bit corresponding to the reserved address pin. The mode signal MODE may include different logic states depending on whether the read mode or the write mode is to be applied to the non-volatile memory 120. For example, if the read mode is to be applied, logic-low data may be stored in the address bits, and if the write mode is applied, logic-high data may be stored in the address bits. Therefore, the non-volatile memory 120 may be able to determine whether the read mode or the write mode is to be applied to the non-volatile memory 120, according to the logic state of the mode signal MODE stored in the address bit.

Figure 3:
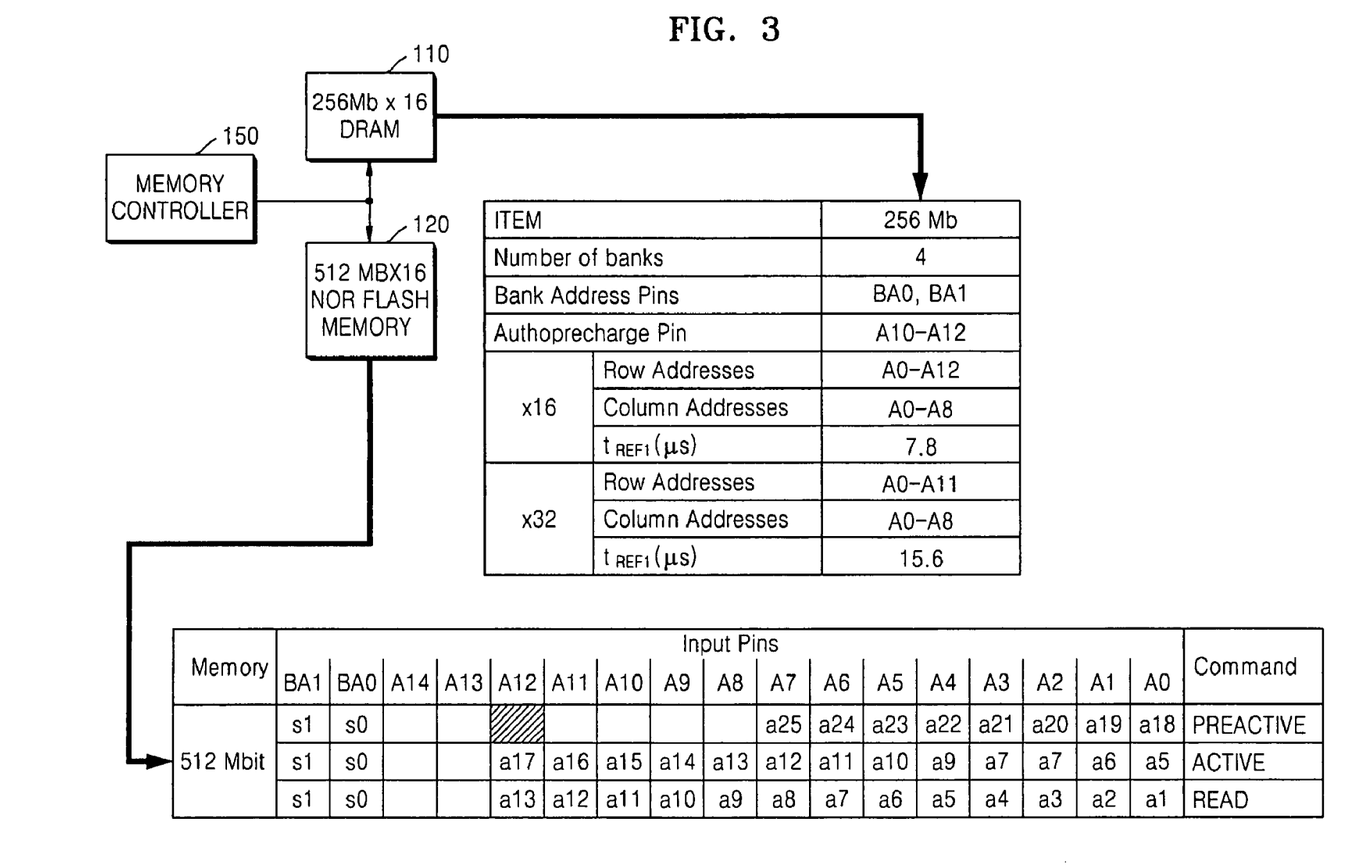
FIG. 3 is a table illustrating address pins that are used in a volatile memory and a non-volatile memory, and address bits corresponding to the address pins in response to an operation command, according to example embodiments.

FIG. 3 is a table illustrating address pins that are used in a volatile memory and a non-volatile memory, and address bits corresponding to the address pins in response to the operation command CMD, according to example embodiments.

Referring to FIG. 3 the non-volatile memory 120 (e.g., NOR flash memory) may require more row addresses and less column addresses than the volatile memory 110 (e.g., DRAM). Therefore, the non-volatile memory 120 may designate a row address that is to be activated for allocation of address bits by using an active command twice. The volatile memory 110 may designate a row address that is to be activated by using address pins A0 through A12. In contrast, the non-volatile memory 120 may designate a row address that is to be activated by using a preactive command PREACTIVE via the address pins A0 through A7 and an active command ACTIVE via the address pins A0 through A12. When data is stored in the address bits of the non-volatile memory 120, the address pins A8 through A12 may not be available for the preactive command PREACTIVE in a 512M (Mega)-bit memory, for example.

Referring to FIG. 3, the mode signal MODE may be transmitted via address pin A12, which may be selected from among the unavailable address pins A8 through A12. Referring to FIG. 3, the shaded portion may denote address bits storing the mode signal MODE (e.g. address pin A12). Although in FIG. 3 address pin A12 may be used, example embodiments are not limited to this designation, where any pin selected among the unavailable pins A8 through 12 to store the mode signal MODE may be within example embodiments.

Referring to FIGS. 2 and 3, the memory controller 150 may transmit the mode signal MODE via the address pin A12 when transmitting the preactive command PREACTIVE. However, the memory controller 150 must transmit the mode signal MODE via a reserved address pin before transmission of the active command ACTIVE (e.g., operation command CMD) to the non-volatile memory 120 because the non-volatile memory must determine whether to perform the sensing operation before the active command ACTIVE may be transmitted to the non-volatile memory 120.

Figure 4:
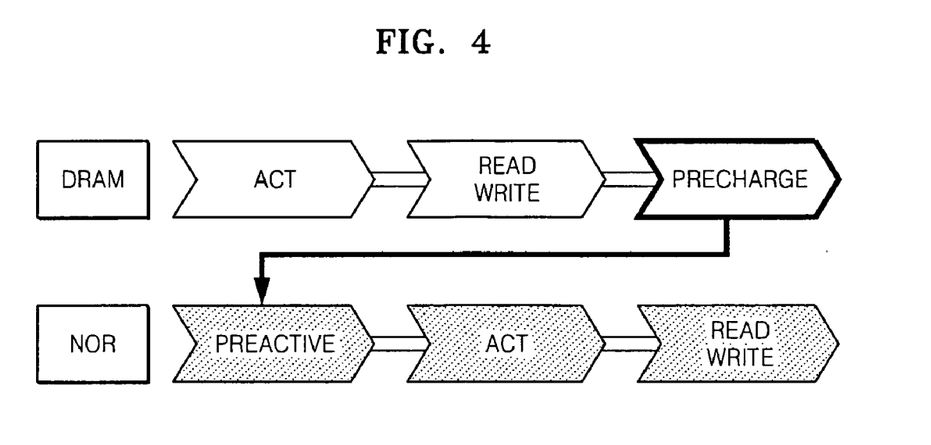
FIG. 4 is a diagram illustrating a process for performing a command in a dynamic random access memory (DRAM) and a NOR flash memory, according to example embodiments.

FIG. 4 is a diagram illustrating a process for performing a command in a DRAM and a NOR flash memory, according to example embodiments.

According to example embodiments, when a volatile memory and a non-volatile memory operate using one common bus, a common command protocol may be needed in order to control the different types of memories having different operating characteristics. Referring to FIG. 4, a DRAM (e.g., volatile memory) may perform a read command READ or a write command WRITE, after an active command ACT is given. After the active command ACT is given, a predetermined length of time $t_{RCD}$ for column access lapses. Also see FIG. 7A. Thereafter, the DRAM may perform a precharge command PRECHARGE. In contrast, a NOR flash memory (e.g., non-volatile memory) may not need to perform the precharge command PRECHARGE according to its operating characteristics, but may rather require the active command ACT twice in order to designate a row address as described with reference to FIG. 3. Therefore, the NOR flash memory may have the same command protocol as the DRAM, since it performs the preactive command PREACTIVE (in place of the precharge command PRECHARGE performed by the DRAM), and then performs the active command ACT and the read command READ/write command WRITE.

Figure 5:
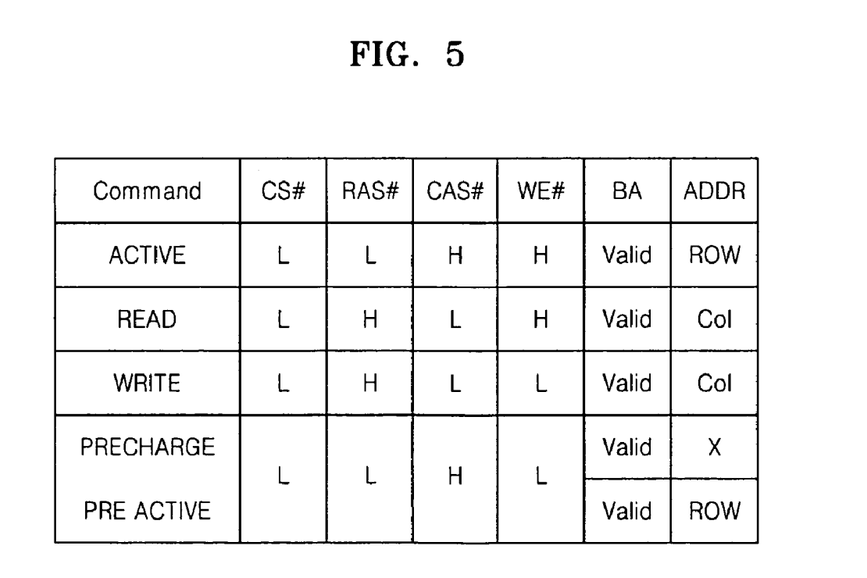
FIG. 5 is a truth table illustrating a volatile memory and a non-volatile memory having the same command protocol according to example embodiments.

FIG. 5 is a truth table illustrating a volatile memory and a non-volatile memory having the same command protocol according to example embodiments. Referring to FIG. 5, the volatile memory and the non-volatile memory may have the same command protocol in terms of an active command ACT, a read command READ, and a write command WRITE. Also, a precharge command PRECHARGE may be performed only in the volatile memory, and a preactive command PREACTIVE may be performed only in the non-volatile memory may operate with the same command protocol. Therefore, a semiconductor memory system according to example embodiments may control both the volatile memory and the non-volatile memory using the same command protocol.

In a method for transmitting the mode signal MODE according to example embodiments, the memory controller 150 of FIG. 2 may utilize a mode register set (MRS) command, in place of the mode signal MODE. The memory controller 150 may transmit a MRS command to the non-volatile memory 120, which may indicate whether the read mode or the write mode is to be applied to the non-volatile memory 120. For example, if the read mode is to be applied, the memory controller 150 may transmit the MRS command to the non-volatile memory 120, and if the write mode is to be applied, the memory controller 150 may not transmit the MRS command to the non-volatile memory 120. Adversely, if the write mode is to be applied, the memory controller 150 may transmit the MRS command to the non-volatile memory 120, and if the read mode is to be applied, the memory controller 150 may not transmit the MRS command.

The memory controller 150 may transmit the MRS command to the non-volatile memory 120 before transmitting the active command ACT to the non-volatile memory 120, where the active command ACT may be an operation command CMD. If a mode that is currently applied ends in response to the MRS command, it may be possible to notify the non-volatile memory 120 by transmitting the MRS command to the non-volatile memory 120. For example, the non-volatile memory 120 may be notified that the write mode is to be applied by using a certain MRS command, and the non-volatile memory 120 may also be notified that the write mode will end when the MRS command is transmitted again during application of the write mode.

Figure 6:
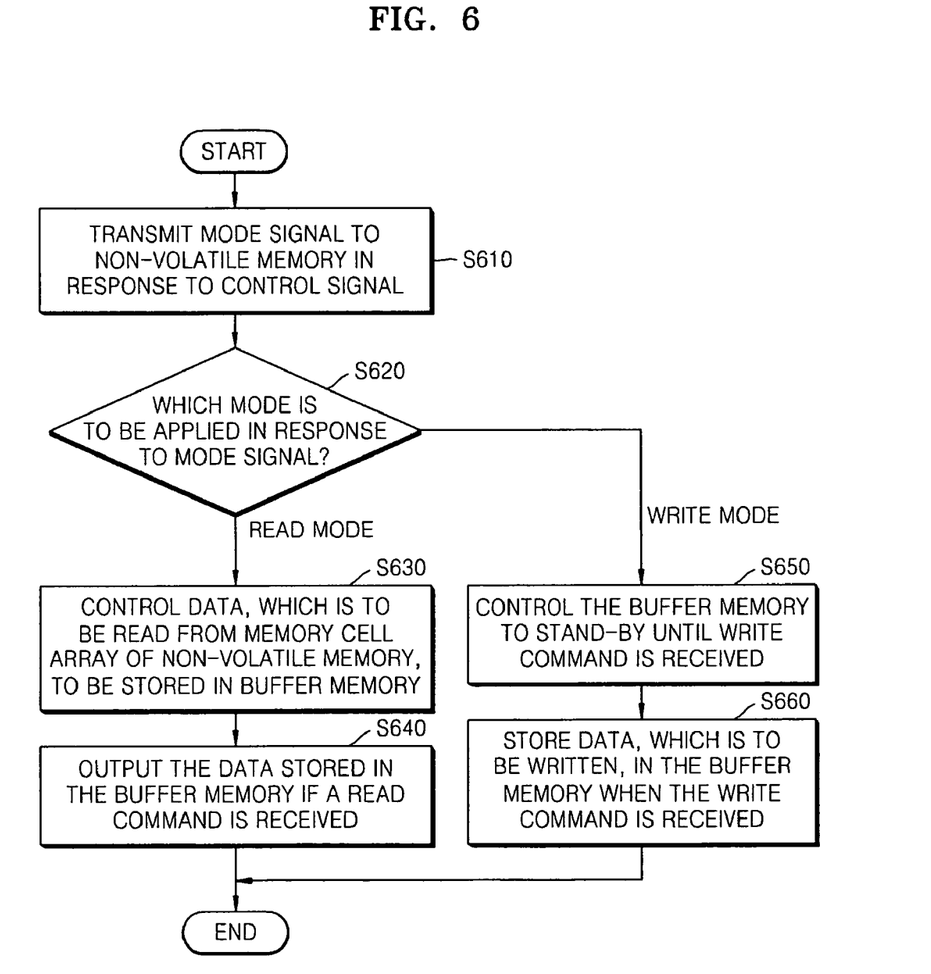
FIG. 6 is a flowchart illustrating a method of controlling the operation of a non-volatile memory of FIG. 1, according to example embodiments.

FIG. 6 is a flowchart illustrating a method for controlling the operation of the non-volatile memory 120 of FIGS. 1 and 2 according to example embodiments. FIG. 7A is an example timing diagram of signals when the non-volatile memory 120 of FIGS. 1 and 2 performs a read operation. FIG. 7B is an example timing diagram of signals when the non-volatile memory 120 of FIGS. 1 and 2 performs a write operation according to example embodiments.

A read/write operation of the non-volatile memory 120 will now be described with reference to FIGS. 1, 2, 3, 6, and 7. The memory controller 150 may transmit a mode signal MODE to the non-volatile memory 120 in response to a control signal CON (operation S610 in FIG. 6). For instance, the mode signal MODE may be transmitted to the non-volatile memory 120 via a reserved address pin of the non-volatile memory 120. If the mode signal MODE is received via the address pin A12 (as illustrated in FIG. 3), during the read mode (as illustrated in FIG. 7A), data stored in address bits corresponding to the address pin A12 may be in a first logic state when a preactive command P-ACT is applied. Also, during the write mode (as illustrated in FIG. 7B), the data stored in the address bit corresponding to the address pin A12 may be in a second logic state when the preactive command P-ACT is applied. In other words, the logic state of the data that is stored in the address bits corresponding to the address pin A12 may depend on whether the read mode or the write mode is to be applied.

It is determined whether the read mode or the write mode is to be applied to the non-volatile memory 120, in response to the mode signal MODE (operation S620 in FIG. 6). Referring to FIG. 6, if it is determined in operation S620 that the read mode is to be applied, the internal controller 250 may control the data read from the memory cell array 210 to be stored in the first buffer memory 220 (operation S630). Referring to FIG. 7A, if the read mode is to be applied, during a first period $t_{RCD}$ for the sensing operation, and between a point of time t1 when an active command ACT may be transmitted and a point of time t2 when a read command READ may be transmitted, the internal controller 250 reads data DQ_0, DQ_1, and so on, from the memory cell array 210 and then may store the data in the first buffer memory 220. In other words, the memory controller 150 may transmit the active command ACT, and then may transmit the read command READ after the first period $t_{RCD}$ for the sensing operation. If the memory controller 150 transmits the read command READ at the point of time t2, the data DQ_0, DQ_1, and so on, stored in the first buffer memory 220 may be output from the non-volatile memory 120 after a duration of time corresponding to a CAS latency CL (operation S640 in FIG. 6).

If it is determined in operation S620 that the write mode is to be applied, the internal controller 250 may control the second buffer memory 230 to stand-by until a write command WRITE is received (operation S650 in FIG. 6). That is, if the write mode is to be applied (as illustrated in FIG. 7B), the internal controller 250 may control the second buffer memory 230 to stand-by for a second period Δt between a point of time t1 when the active command ACT is transmitted and a point of time t4 when a write command WRITE is transmitted. That is, in the write mode, the second buffer memory 230 may not perform the sensing operation during the second period Δt. The memory controller 150 may transmit the active command ACT, and then may transmit the write command WRITE after the second period Δt. In contrast to the read mode, the write mode may not need a duration of time corresponding to the first period $t_{RCD}$ for the sensing operation, and thus can nor- mally perform the write operation even if the second period Δt is shorter than the first period $t_{RCD}$. If the memory controller 150 transmits the write command WRITE at the point of time t4, the data DQ_0, DQ_1, and so on, may be written to the second buffer memory 230 (operation S660 in FIG. 6).

Figure 8:
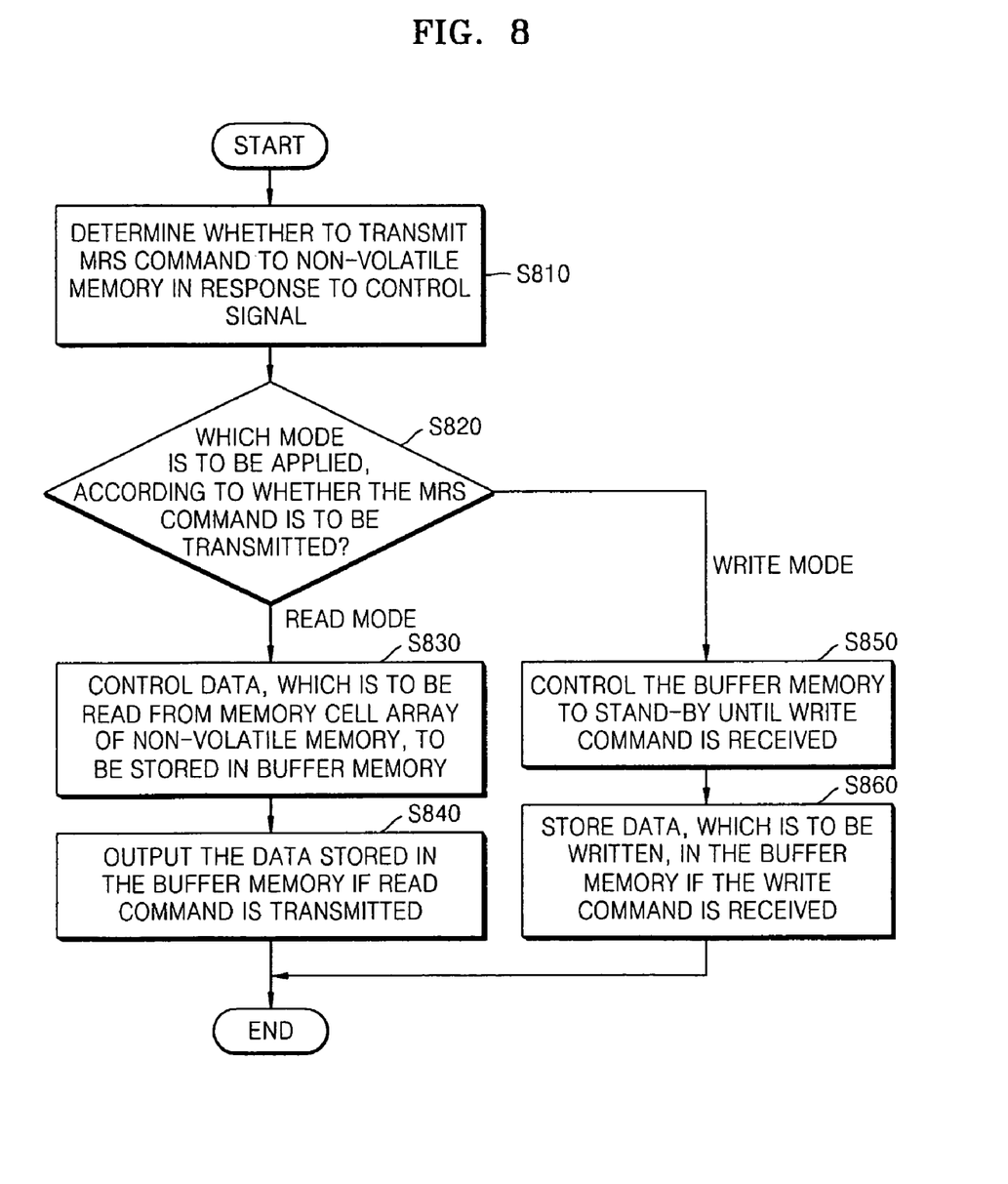
FIG. 8 is a flowchart illustrating a method for controlling the operation of the non-volatile memory of FIGS. 1 and 2, according to example embodiments.

FIG. 8 is a flowchart illustrating a method for controlling the operation of the non-volatile memory of FIGS. 1 and 2, according to example embodiments.

Referring to FIGS. 1, 2, 7, and 8, the memory controller 150 may determine whether to transmit a MRS command to the non-volatile memory 120 in response to a control signal CON (operation S810 in FIG. 8). The non-volatile memory 120 may determine whether the read mode or the write mode is to be applied, depending on whether the MRS command is to be transmitted (operation S820 in FIG. 8). Assuming that the MRS command indicates that the write mode is to be applied, if the memory controller 150 transmits the MRS command, it may be determined that the write mode is to be applied to the non-volatile memory 120. If it is determined that the MRS command is not to be transmitted, it may be determined that the read mode is to be applied to the non-volatile memory 120. Adversely, assuming that the MRS command indicates that the read mode is to be applied, it may determined that the read mode is to be applied to the non-volatile memory 120 if the MRS command is transmitted, and that the write mode may be to be applied to the non-volatile memory 120 if the MRS command is not transmitted. Also, if the MRS command is applied again during application of the write mode or the read mode, it may be determined that the write mode or the read mode is to end.

If it is determined in operation S820 (FIG. 8) that the read mode is to be applied, operations S830 and S840 may be performed in the same manner that operations S630 and S640 of FIG. 6 are performed. If it is determined in operation S820 (FIG. 8) that the write mode is to be applied, operations S850 and S860 may be performed in the same manner that operations S650 and S660 of FIG. 6 are performed.

As described above, in a semiconductor memory system including a volatile memory and a non-volatile memory, which share a common bus, and a method for controlling the operation of the non-volatile memory, according to example embodiments, the non-volatile memory may be controlled in various ways depending on whether the non-volatile memory is to perform a read operation or a write operation, thereby reducing the consumption of current and the time required to perform the read/write operations.

While example embodiments have been shown and described with reference to FIGS. 1-8, it will be understood by those skilled in the art that various changes in form and details may be made therein without departing from the spirit and scope of this disclosure.

What is claimed is:

1. A semiconductor memory system including a volatile memory and a non-volatile memory that share a common bus, the system comprising:
   a non-volatile memory including a buffer memory that temporarily stores data to be read from or to be written to a memory cell array, and an internal controller; and
   a memory controller transmitting a mode signal to the non-volatile memory in response to a control signal, the control signal corresponds to either a read mode or a write mode to be applied to the non-volatile memory, wherein if the read mode is applied in response to the mode signal, the internal controller controls the data to be read to be stored in the buffer memory, and if the write mode is applied in response to the mode signal, the internal controller controls the buffer memory to stand-by until a write command is received.

2. The system of claim 1, wherein the memory controller transmits the mode signal via a reserved address pin of the non-volatile memory in response to the control signal.

3. The system of claim 2, wherein the mode signal includes different logic states depending on whether the read mode or the write mode to be applied, the mode signal being stored in an address bit corresponding to the reserved address pin, and the internal controller controls the buffer memory according to the logic state of the mode signal stored in the address bit.

4. The system of claim 1, wherein the mode signal corresponds to the read mode or the write mode to be applied to the non-volatile memory.

5. The system of claim 1, wherein the memory controller transmits the mode signal to the non-volatile memory before transmitting an active command to the non-volatile memory.

6. The system of claim 1, wherein the non-volatile memory comprises:
a first buffer memory temporarily storing the data to be read; and
a second buffer memory temporarily storing the data to be written.

7. The system of claim 6, wherein if the read mode is to be applied, the internal controller controls the data to be read to be stored in the first buffer memory,
if the write mode is applied, the internal controller controls the second buffer memory to stand-by until a write command is received, and then controls the data to be written to be stored in the second buffer memory when the write command is received.

8. The system of claim 6, wherein if the read mode is to be applied in response to the control signal, the memory controller transmits a read command to the non-volatile memory after a first period, and if the write mode is to be applied in response to the control signal, the memory controller transmits a write command to the non-volatile memory after a second period, the first period is a period when the data to be read is stored in the first buffer memory, and the second period is a standby period when the data to be written waits to be written to the second buffer memory.

9. The system of claim 8, wherein the second period is shorter than the first period.

10. The system of claim 1, wherein the mode signal is in a first logic state if the read mode is to be applied, and is in a second logic state if the write mode is to be applied.

11. The system of claim 1, wherein the control signal is in a first logic state if the read mode is to be applied, and is in a second logic state if the write mode is to be applied.

12. The system of claim 1, wherein the volatile memory is dynamic random access memory (DRAM) or static random access memory (SRAM).

13. The system of claim 1, wherein the non-volatile memory is NOR flash memory, NAND flash memory, or phase change random access memory (PRAM).

14. The system of claim 1, wherein the mode signal is an MRS (mode register set) command.

15. The system of claim 14, wherein the memory controller transmits the MRS command if the read mode is to be applied to the non-volatile memory, and the memory controller does not transmit the MRS command if the write mode is to be applied to the non-volatile memory.

16. The system of claim 14, wherein the memory controller transmits the MRS command if the write mode is to be applied to the non-volatile memory, and the memory controller does not transmit the MRS command if the read mode is to be applied to the non-volatile memory.

17. The system of claim 14, wherein the memory controller transmits the MRS command to the non-volatile memory if the read mode or the write mode applied in response to the MRS command ends.

18. A method for controlling the operation of a non-volatile memory of a semiconductor memory system including a volatile memory and the non-volatile memory that share a common bus, wherein the non-volatile memory includes a memory cell array and a buffer memory, the buffer memory temporarily stores data to be read from or written to the memory cell array, the method comprising:
transmitting a mode signal to the non-volatile memory in response to a control signal, the control signal corresponds to either a read mode or a write mode to be applied to the non-volatile memory;
determining whether the read mode or the write mode is to be applied to the non-volatile memory in response to the mode signal;
if the read mode is to be applied, controlling the data to be read to be stored in the buffer memory; and
if the write mode is to be applied, controlling the buffer memory to stand-by until a write command is received.

19. The method of claim 18, wherein the transmitting of the mode signal comprises:
transmitting the mode signal via a reserved address pin of the non-volatile memory, in response to the control signal.

20. The method of claim 19, further comprising:
storing the transmitted mode signal in an address bit corresponding to the reserved address pin, the mode signal includes different logic states depending on whether the read mode or the write mode to be applied.

21. The method of claim 20, wherein the determining of whether the read mode or the write mode to be applied comprises:
determining whether the read mode or the write mode to be applied to the non-volatile memory according to the logic state of the mode signal stored in the address bit.

22. The method of claim 18, wherein the mode signal corresponds to the read mode or the write mode to be applied to the non-volatile memory.

23. The method of claim 18, wherein the determining of whether the read mode or the write mode to be applied comprises:
if the mode signal is in a first logic state, determining that the read mode is to be applied to the non-volatile memory; and
if the mode signal is in a second logic state, determining that the write mode is to be applied to the non-volatile memory.

24. The method of claim 18, wherein the transmitting of the mode signal comprises:
transmitting the mode signal to the non-volatile memory before transmitting an active command to the non-volatile memory.

25. The method of claim 18, further comprising:
determining whether the read mode or the write mode to be applied to the non-volatile memory in response to the control signal;
if the read mode is to be applied, transmitting a read command to the non-volatile memory after a first period, the first period is a period when the data to be read is stored in the buffer memory; and
if the write mode is to be applied, transmitting a write command to the non-volatile memory after a second period, the second period is a period when the data to be written waits to be written to the buffer memory.

26. The method of claim 25, wherein the second period is shorter than the first period.

27. A method for controlling the operation of a non-volatile memory of a semiconductor memory system including a volatile memory and the non-volatile memory that share a common bus, wherein the non-volatile memory includes a memory cell array and a buffer memory, the buffer memory temporarily stores data to be read from or written to the memory cell array, the method comprising:
   determining whether to transmit a MRS (mode register set) command to the non-volatile memory in response to a control signal, the control signal corresponds to either a read mode or a write mode to be applied to the non-volatile memory;
   if the read mode to be applied is based on whether the MRS command is transmitted, controlling the data to be read to be stored in the buffer memory; and
   if the write mode to be applied is based on whether the MRS command is transmitted, controlling the buffer memory to stand-by until a write command is transmitted.

28. The method of claim 27, further comprising determining that the read mode is to be applied if the MRS command is transmitted, and that the write mode is to be applied if the MRS command is not transmitted.

29. The method of claim 27, further comprising:
   determining that the write mode is to be applied if the MRS command is transmitted, and that the read mode is to be applied if the MRS command is not transmitted.

30. The method of claim 27, further comprising:
   transmitting the MRS command to the non-volatile memory again if the read mode or the write mode ends.

31. The method of claim 27, wherein the determining of whether to transmit the MRS command comprises:
   determining whether to transmit the MRS command to the non-volatile memory before transmitting an active command to the non-volatile memory.

32. The method of claim 27, further comprising:
   determining whether the read mode or the write mode is to be applied to the non-volatile memory in response to the control signal;
   if the read mode is to be applied, transmitting a read command to the non-volatile memory after a first period, the first period is a period when the data to be read is stored in the buffer memory; and
   if the write mode is to be applied, transmitting a write command to the non-volatile memory after a second period, the second period is a period when the data to be written waits to be written to the buffer memory.

33. The method of claim 32, wherein the second period is shorter than the first period.

\* \* \* \* \*